United States Patent
Xiang et al.

(10) Patent No.: US 11,393,221 B2
(45) Date of Patent: Jul. 19, 2022

(54) LOCATION ESTIMATION APPARATUS AND LOCATION ESTIMATION SYSTEM

(71) Applicant: DENSO CORPORATION, Kariya (JP)

(72) Inventors: Jingyu Xiang, Nisshin (JP); Masataka Hirai, Kariya (JP)

(73) Assignee: DENSO CORPORATION, Kariya (JP)

( * ) Notice: Subject to any disclaimer, the term of this patent is extended or adjusted under 35 U.S.C. 154(b) by 64 days.

(21) Appl. No.: 16/452,896

(22) Filed: Jun. 26, 2019

(65) Prior Publication Data

US 2020/0005057 A1    Jan. 2, 2020

(30) Foreign Application Priority Data

Jun. 28, 2018    (JP) .............................. JP2018-123161

(51) Int. Cl.
| | |
|---|---|
| G06V 20/58 | (2022.01) |
| G06T 7/70 | (2017.01) |
| H04W 4/02 | (2018.01) |
| H04W 4/44 | (2018.01) |

(52) U.S. Cl.
CPC .............. G06V 20/584 (2022.01); G06T 7/70 (2017.01); H04W 4/025 (2013.01); H04W 4/44 (2018.02); G06T 2207/30252 (2013.01)

(58) Field of Classification Search
CPC ................. G06K 9/00825; G06T 7/70; G06T 2207/30252; H04W 4/025; H04W 4/44
See application file for complete search history.

(56) References Cited

U.S. PATENT DOCUMENTS

| | | | |
|---|---|---|---|
| 9,631,943 | B2 | 4/2017 | Shashua et al. |
| 2015/0378015 | A1 | 12/2015 | You et al. |
| 2016/0305794 | A1 | 10/2016 | Horita et al. |
| 2017/0008521 | A1 | 1/2017 | Braunstein et al. |
| 2017/0008562 | A1 | 1/2017 | Shashua et al. |
| 2017/0010104 | A1 | 1/2017 | Aviel |
| 2017/0010105 | A1 | 1/2017 | Gdalyahu et al. |
| 2017/0010106 | A1 | 1/2017 | Shashua et al. |
| 2017/0010107 | A1 | 1/2017 | Shashua et al. |
| 2017/0010108 | A1 | 1/2017 | Shashua |
| 2017/0010109 | A1 | 1/2017 | Hayon et al. |
| 2017/0010115 | A1 | 1/2017 | Stein et al. |
| 2017/0010120 | A1 | 1/2017 | Shashua et al. |
| 2017/0010121 | A1 | 1/2017 | Shashua et al. |
| 2017/0010124 | A1 | 1/2017 | Reisman et al. |
| 2017/0010614 | A1 | 1/2017 | Shashua et al. |

(Continued)

FOREIGN PATENT DOCUMENTS

| | | |
|---|---|---|
| JP | H10-122871 A | 5/1998 |
| JP | H11-144182 A | 5/1999 |

(Continued)

*Primary Examiner* — Zhitong Chen
(74) *Attorney, Agent, or Firm* — Maschoff Brennan (57) ABSTRACT

A location estimation apparatus includes an image acquiring unit configured to acquire an image of a surrounding environment, an extracting unit configured to extract information of a landmark from the image, a receiving unit configured to receive information of the landmark, a specifying unit configured to specify the landmark by comparing the received information of the landmark and the extracted information of the landmark, and an estimating unit configured to estimate a current location using information of the specified landmark and the image.

5 Claims, 6 Drawing Sheets

(56) References Cited

U.S. PATENT DOCUMENTS

| | | | |
|---|---|---|---|
| 2017/0010616 A1 | 1/2017 | Shashua et al. | |
| 2017/0010617 A1 | 1/2017 | Shashua et al. | |
| 2017/0010618 A1* | 1/2017 | Shashua | G05D 1/0088 |
| 2017/0031359 A1 | 2/2017 | Shashua et al. | |
| 2017/0248960 A1 | 8/2017 | Shashua et al. | |
| 2017/0336792 A1 | 11/2017 | Gdalyahu et al. | |
| 2017/0336793 A1 | 11/2017 | Shashua et al. | |
| 2017/0336794 A1 | 11/2017 | Shashua et al. | |
| 2017/0336801 A1 | 11/2017 | Shashua et al. | |
| 2017/0364082 A1 | 12/2017 | Taieb et al. | |
| 2018/0217600 A1 | 8/2018 | Shashua et al. | |
| 2019/0271550 A1* | 9/2019 | Breed | G08G 1/147 |

FOREIGN PATENT DOCUMENTS

| | | |
|---|---|---|
| JP | 2001-283373 A | 10/2001 |
| JP | 2007-093260 A | 4/2007 |
| JP | 2012-133726 A | 7/2012 |
| JP | 2017-073023 A | 4/2017 |

* cited by examiner

RESTAURANT C

CONVERTED INFORMATION : ABBDEDEZCE

CONVERTED INFORMATION : ABBDED??C?

FIG.8

LOCATION ESTIMATION APPARATUS AND LOCATION ESTIMATION SYSTEM

CROSS-REFERENCE TO RELATED APPLICATION

This application is based on and claims the benefit of priority from earlier Japanese Patent Application No. 2018-123161 filed Jun. 28, 2018, the description of which is incorporated herein by reference.

TECHNICAL FIELD

The present disclosure relates to a location estimation apparatus and a location estimation system.

BACKGROUND

Conventionally, a method for estimating a self-location using landmarks is known.

SUMMARY

According to one aspect of the present invention, a location estimation apparatus is provided.

This location estimation apparatus includes an image acquiring unit configured to acquire an image of a surrounding environment, an extracting unit configured to extract information of a landmark from the image, a receiving unit configured to receive information of the landmark, a specifying unit configured to specify the landmark by comparing the received information of the landmark and the extracted information of the landmark, and an estimating unit configured to estimate a current location using information of the specified landmark and the image.

DETAILED DESCRIPTION OF THE PREFERRED EMBODIMENTS

In a conventionally known method for estimating a self-location using landmarks, for example, there has been a case where landmarks cannot be correctly observed due to weather such as fog. In such a case, information of the landmarks cannot be correctly acquired, and, as a result, there is a possibility that a self-location cannot be estimated.

The present invention can be implemented as the following aspects.

According to one aspect of the present invention, a location estimation apparatus is provided.

This location estimation apparatus includes an image acquiring unit configured to acquire an image of a surrounding environment, an extracting unit configured to extract information of a landmark from the image, a receiving unit configured to receive information of the landmark, a specifying unit configured to specify the landmark by comparing the received information of the landmark and the extracted information of the landmark, and an estimating unit configured to estimate a current location using information of the specified landmark and the image.

According to the location estimation apparatus in this aspect, since the information of the landmark can be correctly acquired by using the received information of the landmark, estimation accuracy of the current location is improved.

A. First Embodiment

Figure 1:
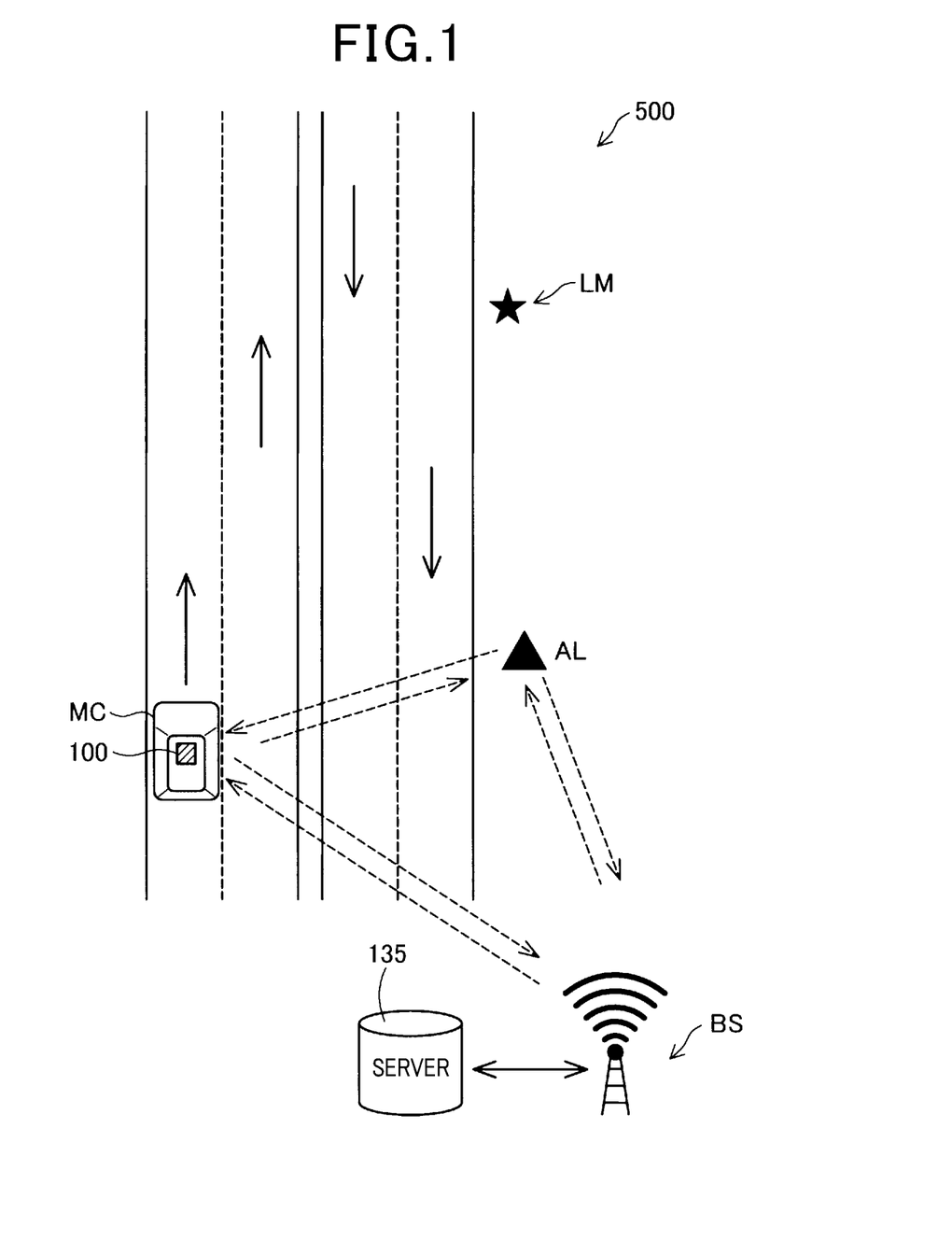
FIG. 1 is a schematic diagram illustrating a configuration of a location recognition system.

As illustrated in FIG. 1, a location estimation system 500 of the present embodiment includes a location estimation apparatus 100, a transmitter AL and a base station BS. In the present embodiment, the location estimation apparatus 100 is mounted on a vehicle MC. Note that the location estimation apparatus 100 may be mounted on an object other than a vehicle, such as, for example, a ship or a drone. Further, the location estimation system 500 may not include the base station BS.

Figure 2:
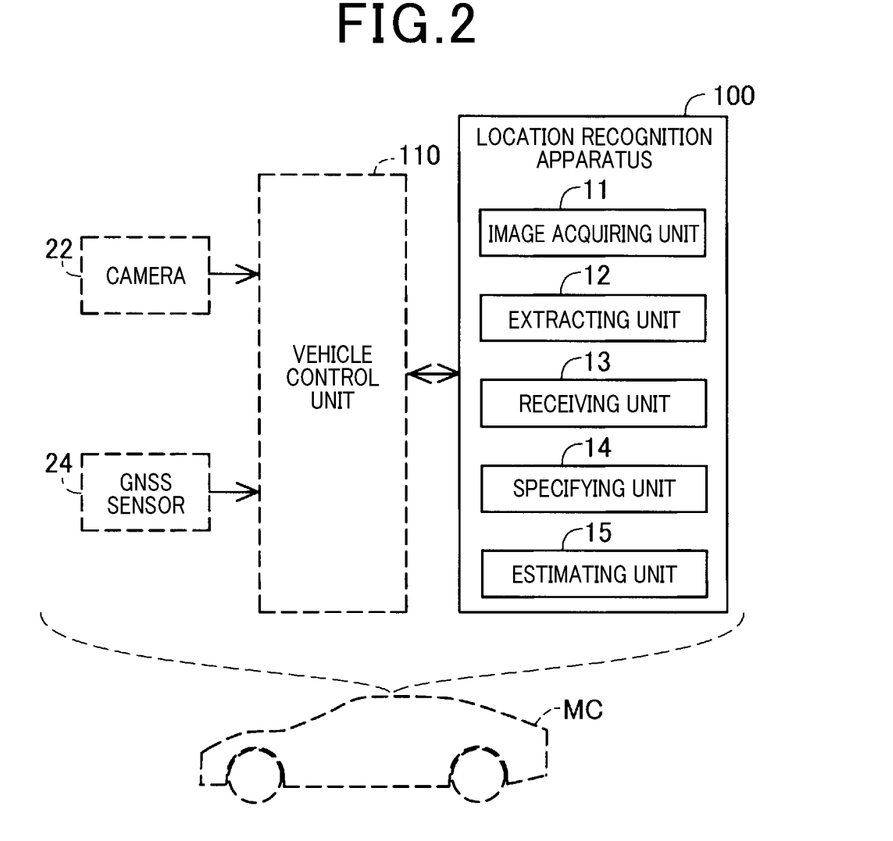
FIG. 2 is a block diagram illustrating a configuration of a vehicle on which a location estimation apparatus is mounted.

As illustrated in FIG. 2, the vehicle MC includes a vehicle control unit 110, a camera 22 and a GNSS sensor 24 in addition to the location estimation apparatus 100. The vehicle control unit 110 is a function part which controls the vehicle MC, and, since the camera 22 and the GNSS sensor 24 are electrically connected to the vehicle control unit 110, the vehicle control unit 110 is notified of detection results by these sensors. The camera 22 acquires an image of a surrounding region in front of the vehicle. The GNSS (Global Navigation Satellite System) sensor 24, which is configured with a GPS (Global Positioning System) sensor, for example, and detects a current location based on radio waves received from a satellite constituting the GPS.

The location estimation apparatus 100 of the present embodiment is electrically connected to the vehicle control unit 110 of the vehicle MC. Specifically, since the location estimation apparatus 100 of the present embodiment is connected to an OBD-II (On-board diagnostics) connector of the vehicle MC, the location estimation apparatus 100 can receive various kinds of information of the vehicle MC from the vehicle control unit 110. Note that connection between the location estimation apparatus 100 and the vehicle MC is not limited to this, and the location estimation apparatus 100 may be connected to the vehicle MC through wireless communication. Further, the location estimation apparatus 100 does not have to be connected to the vehicle MC, and the camera 22 and the GNSS sensor 24 may be separately provided at the location estimation apparatus 100. Although power is supplied from the OBD-II connector to the location estimation apparatus 100 in the present embodiment, the configuration is not limited to this, and a battery may be separately provided at the location estimation apparatus 100, or power for the location estimation apparatus 100 may be supplied from a cigarette lighter port of the vehicle MC.

The location estimation apparatus 100 includes an image acquiring unit 11, an extracting unit 12, a receiving unit 13, a specifying unit 14 and an estimating unit 15. The location estimation apparatus 100 is configured as a well-known computer including a CPU, and a memory such as a ROM and a RAM. The image acquiring unit 11 acquires an image of a surrounding environment. In the present embodiment, an image acquired by the camera 22 is acquired from the vehicle MC. The extracting unit 12 extracts information of a landmark from the acquired image. Here, the landmark refers to an object which can be used in SLAM. The SLAM stands for Simultaneous Localization And Mapping, and is a method in which self-location estimation and creation of an environmental map are performed at the same time. Examples of the landmark can include, for example, an information sign and a signboard. The receiving unit 13 receives information of the landmark from the transmitter AL. The specifying unit 14 specifies a landmark by comparing the received information of the landmark and the extracted information of the landmark. The estimating unit 15 estimates a current location using the information of the landmark.

The transmitter AL is equipment which transmits the information of the landmark to the location estimation apparatus 100. In the present embodiment, the transmitter AL is provided at a traffic light. The transmitter AL transmits the information regarding the landmark at predetermined intervals.

The base station BS is a base station which can perform communication with the transmitter AL and the location estimation apparatus 100. The base station BS includes a server 135, and the server 135 collects and manages information communicated with the transmitter AL and the location estimation apparatus 100. The information managed by the server 135 is used for telematics service for vehicle, road-to-vehicle cooperation service, and vehicle-to-vehicle cooperation service. Current location estimation processing of the location estimation apparatus 100 in the present embodiment will be described below.

Figure 3:
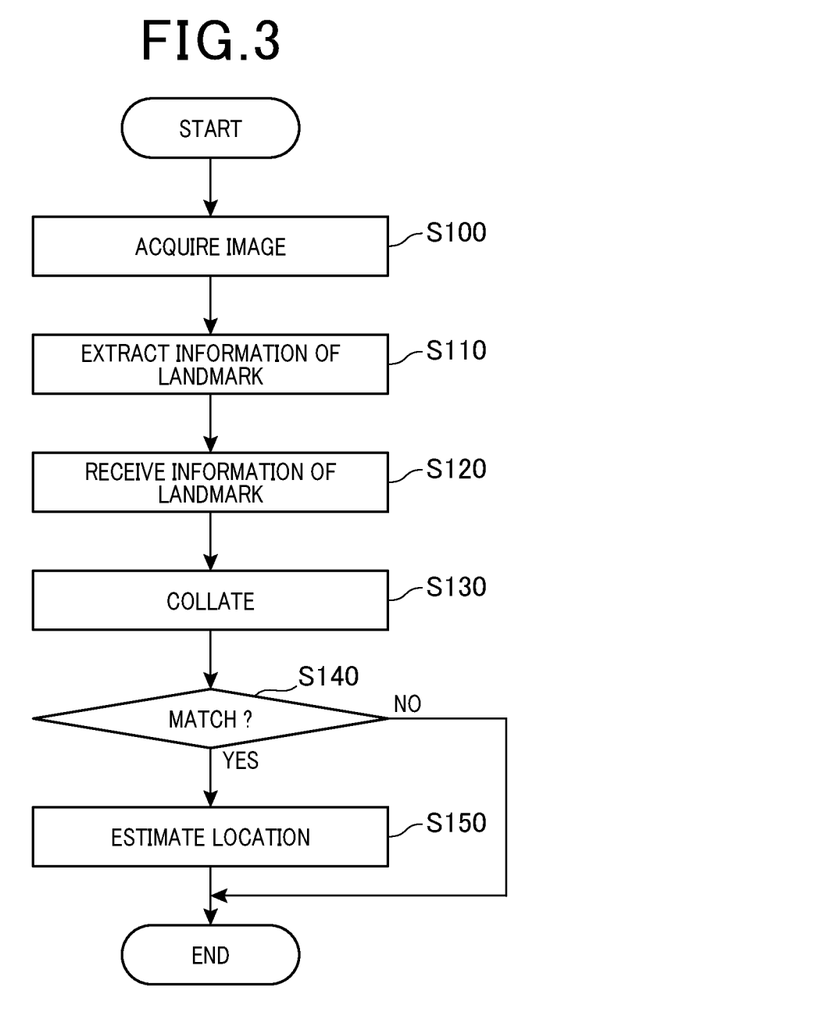
FIG. 3 is a flowchart explaining current location estimation processing in the present embodiment.

As illustrated in FIG. 3, first, the image acquiring unit 11 of the location estimation apparatus 100 acquires an image of a surrounding environment. In the present embodiment, the image acquiring unit 11 acquires an image acquired by the camera 22 of the vehicle MC via the vehicle control unit 110 (step S100).

Figure 4:
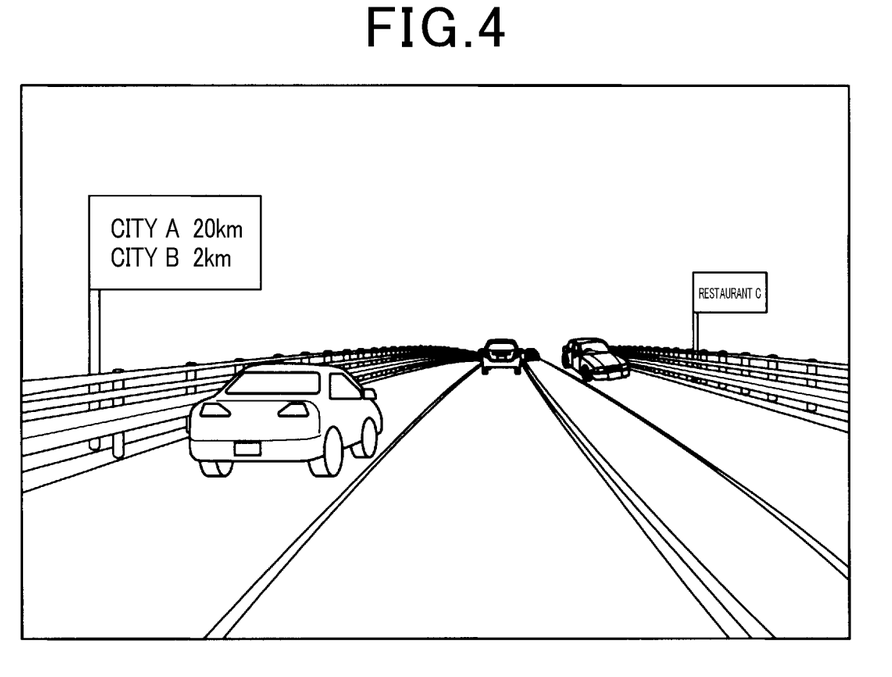
FIG. 4 is a diagram illustrating an example of an image acquired in a case of clear weather.

After the image is acquired, the extracting unit 12 of the location estimation apparatus 100 extracts information of a landmark from the acquired image (step S110). An image illustrated in FIG. 4 is an example of an image acquired in a case of clear weather. In the present embodiment, the extracting unit 12 of the location estimation apparatus 100, first, recognizes an object from the image. In the present embodiment, the extracting unit 12 recognizes a landmark as an object, and, more specifically, the extracting unit 12 recognizes a signboard of "Restaurant C" in a right part of the drawing in FIG. 4 as an object. The extracting unit 12 then extracts information of the landmark using the signboard of "Restaurant C" as a landmark LM. A method for extracting information of a landmark will be described using FIG. 5.

Figure 5:
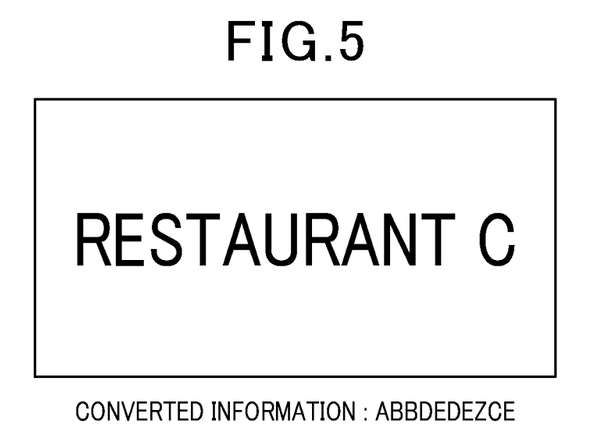
FIG. 5 is a diagram explaining extraction of information of a landmark.

In the present embodiment, an image indicating the landmark is converted into digital information such as text with less data information than that of the image using an arbitrary mapping function. By this means, it is possible to reduce data information to be handled by the location estimation apparatus 100, so that the location estimation apparatus 100 can promptly perform processing. In the present embodiment, as the information of the landmark, information obtained by converting information of the sign into alphabetical characters using a mapping function is used. Specifically, the extracting unit 12 obtains information of the alphabetical characters f "ABBDEDEZCE" by, after determining an outer shape of the sign, dividing the interior into regions having predetermined shapes and respectively converting images in the respective divided regions into alphabetical characters using a mapping function. In a case of good visibility, as in clear weather, the extracting unit 12 of the location estimation apparatus 100 can normally correctly extract information of a landmark.

Figure 6:
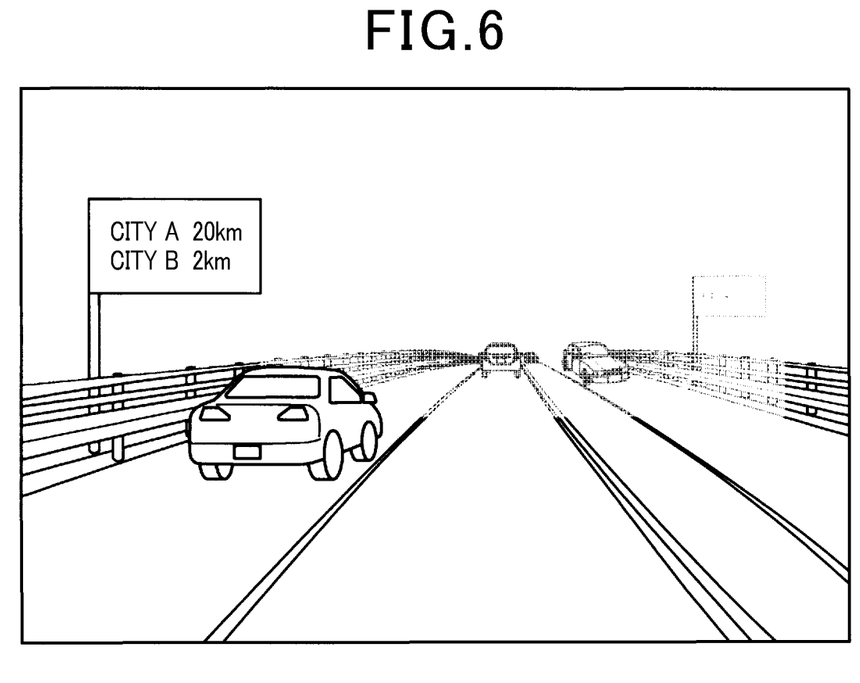
FIG. 6 is a diagram illustrating an example of an image acquired in a case of fog.
Figure 7:
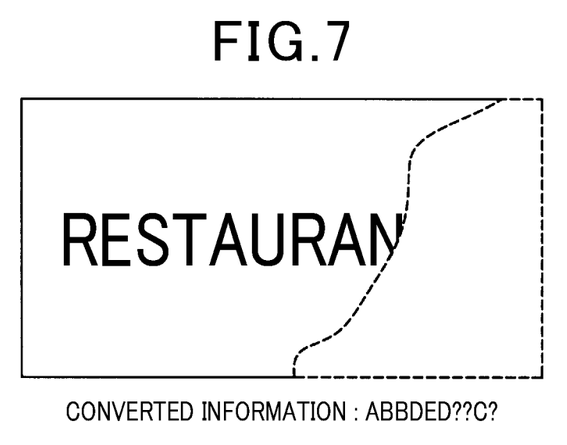
FIG. 7 is a diagram explaining extraction of information of a landmark.

On the other hand, there is a case where information of a landmark cannot be correctly extracted. For example, the image illustrated in FIG. 6 is an example of an image acquired in a case of fog. In such a case, as illustrated in FIG. 7, a blurred portion may occur in part of the image, and, as a result, there is a case where the extracting unit 12 of the location estimation apparatus 100 cannot correctly extract information of a landmark from the image. Specifically, although information after being converted using the mapping function should be "ABBDEDEZCE" if the information is correctly recognized, there is a case where the information may be converted into, for example, "ABBDBD??C?".

Even in such a case, in the present embodiment, it is possible to estimate the current location by performing the following processing. Specifically, as illustrated in FIG. 3, the receiving unit 13 of the location estimation apparatus 100 receives information of the landmark from the transmitter AL (step S120). In the present embodiment, after the transmitter AL transmits information of "ABBDEDEZCE" which indicates information of the "Restaurant C" after being converted using the mapping function, the receiving unit of the location estimation apparatus 100 receives this information. The transmitter AL has stored therein information specifying a landmark around the transmitter AL in advance. The transmitter AL repeatedly transmits this information. The number of pieces of the information specifying the landmark, transmitted by the transmitter AL is not limited to one, and there is also a case where the transmitter AL transmits two or more pieces of the information specifying the landmark.

Thereafter, the specifying unit 14 of the location estimation apparatus 100 compares the received information of the landmark and the extracted information of the landmark (step S140). Then, in a case where there is match between the information (S140: Yes), the specifying unit 14 can specify the landmark. In the present embodiment, a case where there is match between the information refers to a case where there is 50% or more match between the extracted information of the landmark and the received information of the landmark. If the transmitter AL transmits a plurality of pieces of information specifying a landmark, the specifying unit 14 sequentially use these pieces of information in comparison.

In a case where there is no match between the information (S140: No), since the received information of the landmark does not match the extracted information of the landmark, the landmark cannot be specified, and the flow is finished.

On the other hand, in the case where there is match between the information (S140: Yes), the specifying unit 14 specifies the landmark, and the current location is estimated using the specified landmark and the image acquired by the image acquiring unit 11 (step S150). Specifically, the estimating unit 15 estimates the current location using a location and a size of the landmark with respect to the whole of the acquired image. Although the flow terminates as described above, this processing is repeatedly performed as long as the location estimation apparatus 100 is powered on.

Normally, the location estimation apparatus 100 recognizes a rough location of the location estimation apparatus 100 from the GNSS sensor 24 of the vehicle MC. However, estimation accuracy of the current location is improved by the processing being performed.

Then, according to the present embodiment, even in the case where the landmark cannot be correctly observed due to weather, or the like, the estimation accuracy of the current location is improved by using the information of the landmark received from the transmitter AL.

Further, in the present embodiment, the transmitter AL is provided at the traffic light. By this means, it is possible to transmit the information of the landmark using existing facilities and power supplies.

Figure 8:
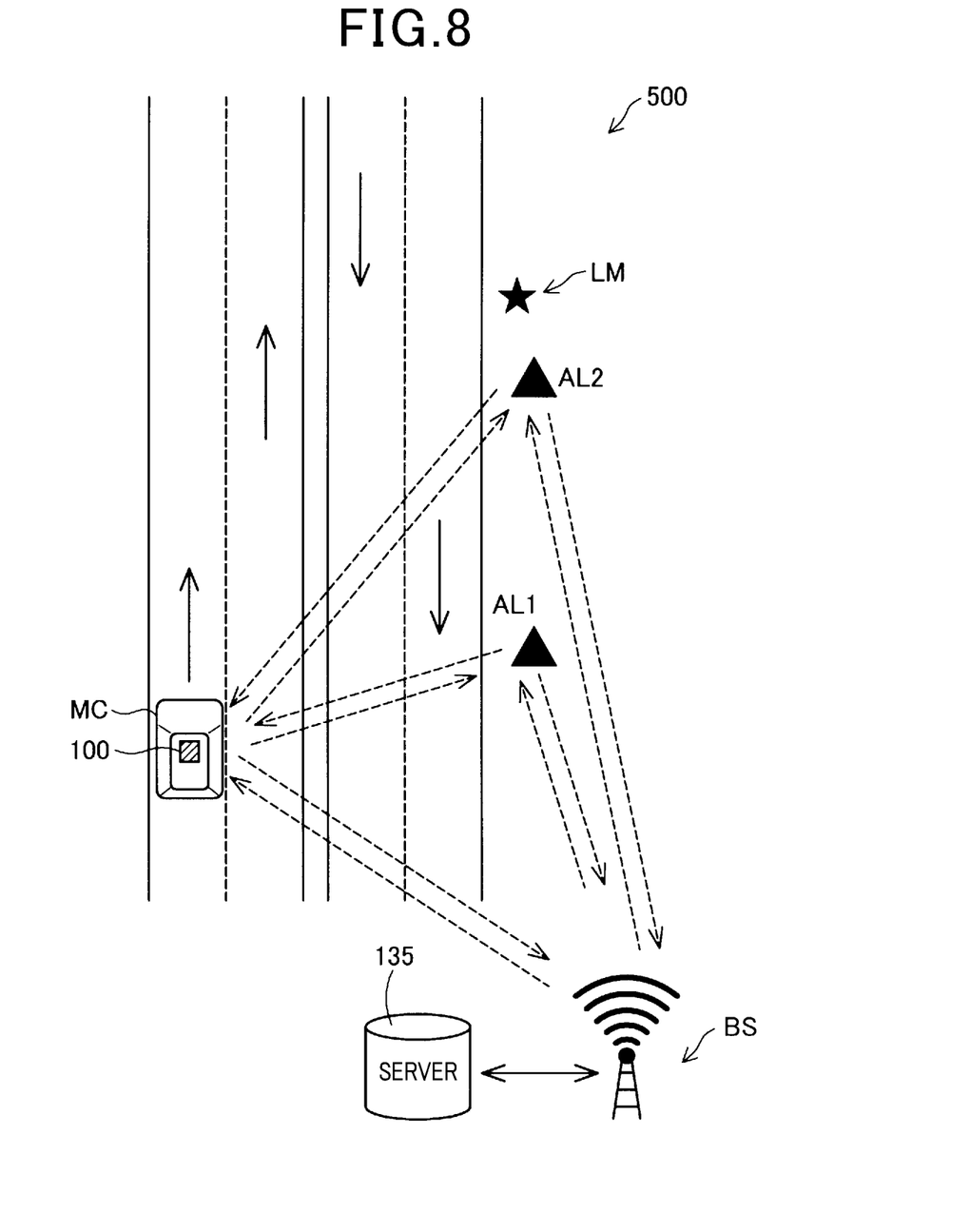
FIG. 8 is a diagram explaining a situation where a plurality of transmitters AL 1 and AL 2 exist.

Here, the information of the landmark transmitted by the transmitter AL may include information of time at which the information of the landmark is transmitted. In a case where a plurality of pieces of information of the landmark are received from a plurality of transmitters AL, the specifying unit 14 of the location estimation apparatus 100 may specify the landmark using the information of the landmark including the latest information of time among the received pieces of the information of the landmark. As illustrated in FIG. 8, even in the case where a plurality of pieces of information of the landmark are received as a result of a plurality of transmitters AL 1 and AL 2 existing, since the landmark is specified using the latest information, it is possible to improve estimation accuracy of the current location.

Moreover, surrounding traffic information may be further included as information to be transmitted by the transmitter AL. By this means, by the vehicle control unit 110 of the vehicle MC being notified of the information received by the location estimation apparatus 100, the vehicle control unit 110 of the vehicle MC can control the vehicle MC in which the surrounding traffic information is reflected.

B. Modified Example

Although the transmitter AL is provided at the traffic light in the above-described embodiment, the configuration is not limited to this. As the transmitter AL, for example, a street light, an electric bulletin board or a communication apparatus of Wi-Fi may be used. Further, the transmitter AL may be embedded in a road or a building. y this means, it is possible to improve flexibility of a location where the transmitter AL is provided. Furthermore, the transmitter AL may be provided at a mobile body such as a drone or a vehicle. By this means, it is possible to use the transmitter AL upon system development. In a case where the transmitter AL is provided at the mobile body, it is only necessary to change the landmark which becomes a target for which information is transmitted, in accordance with a location where the mobile body moves.

The present invention is not limited to the above-described embodiment and modified examples, and can be implemented with various configurations within a range not deviating from the scope of the present invention. For example, technical features in the present embodiment and the modified examples corresponding to technical features in each aspect can be appropriately replaced or combined to solve part or all of the above-described problems or to achieve part or all of the above-described effects. Further, unless it is described in the present specification that the technical features are essential, the technical features can be deleted as appropriate.

What is claimed is:

1. A location estimation apparatus comprising:
an image acquiring unit configured to acquire an image of a surrounding environment;
an extracting unit configured to extract information of a landmark from the image, wherein extracting the information includes converting image information that corresponds to the landmark into textual digital information that represents characteristics about the landmark and that has less data than the image information and wherein the textual digital information is incomplete with respect to the landmark due to weather conditions causing at least partial obstruction of the landmark in the image;
a receiving unit configured to receive information of the landmark, the received information being in a same format as the textual digital information;
a specifying unit configured to specify the landmark by comparing the received information of the landmark and the textual digital information of the landmark, wherein the landmark is specified using the received information based on the textual digital information satisfying a matching threshold with respect to the received information, as determined from the comparing; and
an estimating unit configured to estimate a current location using information of the specified landmark and the image.

2. A location estimation system comprising:
a location estimation apparatus including:
an image acquiring unit configured to acquire an image of a surrounding environment;
an extracting unit configured to extract information of a landmark from the image, wherein extracting the information includes converting image information that corresponds to the landmark into textual digital information that represents characteristics about the landmark and that has less data than the image information and wherein the textual digital information is incomplete with respect to the landmark due to weather conditions causing at least partial obstruction of the landmark in the image;
a receiving unit configured to receive information of the landmark, the received information being in a same format as the textual digital information;
a specifying unit configured to specify the landmark by comparing the received information of the landmark and the textual digital information of the landmark, wherein the landmark is specified using the received information based on the textual digital information satisfying a matching threshold with respect to the received information, as determined from the comparing; and
an estimating unit configured to estimate a current location using information of the specified landmark and the image; and
a transmitter configured to transmit the information of the landmark to the location estimation apparatus, wherein
the information of the landmark to be transmitted by the transmitter includes information of time at which the information of the landmark is transmitted, and
in a case where a plurality of pieces of information of the landmark are received, the specifying unit specifies the landmark using information of the landmark including the latest information of time among the received pieces of the information of the landmark.

3. The location estimation system according to claim 2, wherein
   the transmitter is provided at a traffic light.

4. The location estimation system according to claim 2, wherein
   the transmitter is embedded in a road or a building.

5. The location estimation system according to claim 2, wherein
   the transmitter is provided at a drone or a vehicle.

* * * * *